United States Patent
Krenkel et al.

(10) Patent No.: US 6,668,985 B2
(45) Date of Patent: Dec. 30, 2003

(54) SAFETY BRAKING DEVICE FOR ELEVATOR

(75) Inventors: Walter Krenkel, Renningen (DE); Ralph Renz, Sindelfingen (DE)

(73) Assignee: Inventio AG, Hergiswil (CH)

( * ) Notice: Subject to any disclaimer, the term of this patent is extended or adjusted under 35 U.S.C. 154(b) by 0 days.

(21) Appl. No.: 09/947,829

(22) Filed: Sep. 6, 2001

(65) Prior Publication Data

US 2002/0029944 A1 Mar. 14, 2002

(30) Foreign Application Priority Data

Sep. 14, 2000 (DE) ........................................ 100 45 881

(51) Int. Cl.$^7$ .............................................. F16D 69/00
(52) U.S. Cl. ............................. 188/251 M; 188/251 A; 188/251 R; 264/29.1
(58) Field of Search ....................... 188/251 M, 251 A, 188/251 R, 250 B, 218 XL; 264/29.1; 428/408, 698; 192/307.7, 107 M

(56) References Cited

U.S. PATENT DOCUMENTS

| | | | |
|---|---|---|---|
| 4,790,052 A | * 12/1988 | Olry ............................. 28/110 |
| 4,815,572 A | * 3/1989 | Froberg et al. ........ 188/251 M |
| 5,007,508 A | * 4/1991 | Lacombe ................. 188/251 A |
| 5,306,678 A | * 4/1994 | Yoshida et al. ................ 501/95 |
| 5,363,943 A | * 11/1994 | Iwashita et al. ......... 188/250 E |
| 5,439,080 A | * 8/1995 | Haneda et al. ......... 188/218 XL |
| 5,462,800 A | * 10/1995 | Yamazaki et al. ........... 428/408 |
| 5,503,257 A | 4/1996 | Sugita et al. |
| 5,546,880 A | * 8/1996 | Ronyak et al. ......... 112/475.01 |
| 5,964,320 A | 10/1999 | Kato et al. |
| 5,979,615 A | 11/1999 | Thompson et al. |
| 6,042,935 A | * 3/2000 | Krenkel et al. ........... 428/307.7 |
| 6,079,525 A | * 6/2000 | Dietrich et al. .......... 188/251 A |
| 6,221,475 B1 | * 4/2001 | Domergue et al. ........ 428/292.1 |
| 6,273,222 B1 | * 8/2001 | Rebstock et al. ........ 188/251 A |
| 6,521,344 B1 | * 2/2003 | Hanzawa ..................... 428/408 |

FOREIGN PATENT DOCUMENTS

| | | |
|---|---|---|
| DE | 197 21 473 | 12/1998 |
| EP | 0 835 853 | 4/1998 |
| GB | 2 274 827 | 8/1994 |

* cited by examiner

Primary Examiner—Jack Lavinder
Assistant Examiner—Mariano Sy
(74) Attorney, Agent, or Firm—MacMillan, Sobanski & Todd LLC

(57) ABSTRACT

A friction element for use in a safety braking device for braking elevators co-operating with at least one elevator guide rail. The friction element has at least one friction surface that can be pressed against the guide rail to decelerate the elevator. The friction element is formed of a fiber-reinforced, ceramic composite material, containing silicon carbide and carbon with carbon fibers as reinforcing components. Preferably, the composite material is formed by a matrix of silicon carbide and carbon and the reinforcing component are exclusively carbon fibers with a minimum length of 10 mm and the volume content of carbon fibers in the friction element being between 30% and 70%.

15 Claims, 4 Drawing Sheets

SAFETY BRAKING DEVICE FOR ELEVATOR

BACKGROUND OF THE INVENTION

The present invention relates to a safety device for elevators with at least one elevator guide rail, securely installed in the elevator shaft and a brake part, comprising at least one friction element with at least one friction surface that can be pressed against the guide rail to decelerate the elevator, with the friction material of the friction element comprising a fiber-reinforced, ceramic composite material containing silicon carbide and carbon fibers as reinforcing components, as well as a procedure for producing such a friction element.

A safety device of the described type or a brake shoe for an emergency stop device for elevators is shown in the U.S. Pat. No. 5,964,320.

Passenger elevators for apartment blocks, observation towers, etc. must contain an independent emergency brake or emergency brake means in addition to the operational brake. Such an emergency brake is designed as a safety stop, which in case of an emergency, i.e. when the elevator car exceeds a specified maximum speed, stops the car by pressing friction linings against the guide rails in the elevator shaft after a delay that is acceptable to passengers in the car and securely holds the car in the stopped, stationary position.

Modern buildings are built increasingly higher, to fully utilize the ground and space available, in particular, in cities. In order to be able to reach the individual floors in such high-rise buildings within a reasonable time, full use is made of maximum permissible speeds of up to 1500 meters per minute. This means that the kinetic energy to be absorbed in case of an emergency, during the deceleration of the car, also increases in line with increasing speeds so that the friction linings of the emergency brakes—functioning as linear brakes—are exposed to extreme loading. Conventional metal friction linings for emergency brake devices in elevators are not able to withstand such an extreme loading, during which temperatures of up to 1000° C. can be generated. Such conventional friction linings as described, for instance, in British published application GB 2 274 827, have a friction surface structure that contains a graphite phase, a steadite phase, a cementite phase and a perlite phase.

In order to meet increasing requirements, ceramic brake linings with silicon nitride as their main component, have been suggested for emergency elevator brakes in recent times.

The U.S. Pat. No. 5,503,257 shows an elevator safety device comprising ceramic brake parts, with the ceramic material consisting of aluminum oxide, silicon nitride or zirconic oxide.

Even such ceramic brake linings or respective brake shoes containing such linings, are pushed to their limit in order to provide a safe function, as during the sudden locking of the brake shoes on the metal guide rails, the inherent brittleness and sensitivity to impact of these ceramics can cause the linings to brake as a result of mechanical overstressing or thermal shock.

The described ceramic brake parts made of aluminum oxide, silicon nitride or zirconic oxide have a smaller dimension than the support plate and are engaged or glued in the retaining elements of the support plate. Due to the ceramic brake parts and the metallic support plate having different expansion behaviors, it must be anticipated that the brake parts will be distorted or loosened at high friction surface temperatures. This may potentially cause the failure of the entire brake device as a result of sheared off or broken off brake parts. Brake parts with larger surface dimensions (i.e. plate-shaped brake parts) can not be used due to their inadequate damage tolerance during the arising bending load.

The U.S. Pat. No. 5,964,320 suggests a brake body for emergency elevator brakes, comprising a braking surface and a multitude of brake parts that are embedded in and protruding over the brake area. These protruding brake parts are made from a composite material, containing a ceramic base material, consisting of the group silicon nitride or titanium boride, sialone and silicon carbide that does not comprise less than 10 weight percent of at least one ceramic material selected from the group that consists of silicon carbide whiskers and silicon carbide platelets. As these brake shoes or friction linings include minimum parts of SiC whiskers (acicular fibers up to a few $\mu$m "micrometers" in length) or SiC platelets (plate-shaped parts at micrometer scale), the ceramics are somewhat strengthened and a small improvement in fracture resistance is achieved. In addition, these brake parts can contain 10 to 55 volume percent of long SiC, Si3N4, C or tungsten fibers, which are, however, in this case arranged vertical to the lining surface. The fibers do, however, only provide a very low level of reinforcement. Whisker and platelet particles are respirable due to their small size and can, when given off as a result of wear and braking abrasion, also be inhaled by humans. Whiskers and platelets are consequently no longer used today due to their toxicity and their use is illegal in most countries.

SUMMARY OF THE INVENTION

Based on the prior art described above, the present invention has the task to further develop a safety device for elevators of the type described above in such a way that the requirements for emergency devices of elevators reaching the maximum permissible speed of up to 1500 meters per minute (equal to 25 m/s) and temperatures in excess of 1000° C. at the emergency brake device, when cars are stopped during emergencies, are fulfilled.

The task is solved by a safety device of the type described above, in which the friction element composite material contains a matrix of silicon carbide (SiC) and carbon (C) and the reinforcing component being formed preferably exclusively from carbon fibers with a minimum length of 10 mm and the volume content of carbon fibers in the friction element lying between 30% and 70%. Such a safety device is, in particular, characterized by 10 mm long or longer carbon fibers reinforcing the friction element; whisker or platelet reinforcing components are thus not required so that during emergency braking, no hazardous abraded dust is generated. The carbon fibers forming the reinforcement component are embedded in a matrix consisting of silicon carbide and carbon. The volume content of carbon fibers in the friction element between 30% and 70% guarantees an sufficiently high break and thermal shock resistance, with a lower volume content of carbon fibers being preferable, where extremely low rates of wear and a high thermal conductivity are to be achieved, whilst a high volume content of carbon fibers should be used, where particularly stringent requirements are made with regard to the mechanical stability of the composite material.

The amount of carbon fibers in the friction element is determined by the required mechanical stability and thermal shock resistance, improving with increasing fiber content. A minimum content of silicon carbide is required for generating adequate friction and wear resistance. Lower volume contents of carbon fibers are preferable in case of moderate driving speeds or where the friction linings can have a respective thickness. High fiber contents should be used, where extreme driving speeds are to be achieved or, where for space reasons, the friction linings must be extremely thin.

In a preferred embodiment, the carbon fibers are arranged as stacked layers of woven and/or knitted fabrics in the friction elements; in this case, the carbon fibers are at least arranged in the area of the friction surface in such a way that they run parallel to it. This fiber arrangement allows the bending moments, generated during the abrupt impact of the linings onto the guide rail during emergencies and when holding the car during standstill with extremely high surface pressures of up to 100/Mpa, to be absorbed. As a result of, in particular, this measure, also large-surface linings can be produced as a single piece, i.e. replacing the multitude of individual, smaller friction elements.

Due to the high fracture resistance, these friction elements can also be produced as circular round plates apart from the rectangular linings and securing holes, cross and longitudinal grooves can be applied without adversely affecting the durability of these friction elements. Consequently, all conventional designs can be used for the installation of such friction elements in safety stops.

Research has also shown that a high ceramic content in friction elements, i.e. a content of silicon carbide of 20 mass percent or more, in particular, in the area of the friction element proximal to the friction surface, has a positive effect on the friction coefficient and wear resistance. Such high ceramic contents advantageously increase the friction coefficient, thermal conductivity and wear resistance. The content of carbon fibers in the area of the friction element proximal to the friction surface should therefore only be as high that the friction heat can be dissipated by a respective thermal conductivity of the composite material with at least 10 W/mK. It was found that where the thermal conductivity was set too low in the area of the friction element proximal to the friction surface, abraded metal particles would deposit on the lining surface, causing localized bonding with the guide rail in emergencies. As a result, parts of the area of the friction element proximal to the friction surface can break off or detach themselves.

An advantageous structure for friction elements are uncoated carbon fibers with a minimum length of 10 mm. Shorter fibers convert to a large extent to silicon carbide under heat treatment and the provision of liquid silicon, which increases wear resistance but, at the same time, adversely influences the material strength as a result of the conversion to SiC. In order to limit or compensate for these negative influences and in order to achieve a minimum strength of 50 Mpa, the used carbon fibers must have a minimum length of 10 mm and a fiber volume content of at least 30% as adequate strength is, in particular, provided by the length of the carbon fibers and the volume content of the fibers. Fiber lengths corresponding to the longest dimensions of the friction element (i.e. length times width) have, however, been found to be most advantageous.

In one embodiment, the friction element can be divided into a core portion and a friction portion at least surrounding the friction surface. In such an arrangement, the core portion and the friction portion can be adapted to the different requirements, i.e. the core portion can be designed for high strength and stability of the friction body, while the friction portion is designed for the specific requirements when locking onto the guide rail during emergencies, i.e. the tribologic behavior (constancy of friction coefficient, wear resistance and thermal conductivity) of the friction part is optimized.

The individual layers from which such a friction element can be constructed, can be connected to each other with reaction siliconization. As part of this process, a joining paste with a high C content is applied to the connection area between the layers prior to ceramization, said paste reacting with the liquid silicon to silicon carbide during subsequent siliconization.

A preferred layer structure contains three layers, allowing on one hand, high ceramic contents to be realized in the area of the friction element proximal to the friction surface and, on the other hand, guaranteeing the adequate mechanical strength of the friction element by providing a strength-optimized layer with high fiber contents. Due to the different contents of carbon fibers, the two layers expand differently during heating, so that potentially high tensile stresses in the area proximal to the friction surface could result in failure. In order to prevent this, an additional third layer is installed between the two layers, whose expansion behavior must be designed in such a way that critical tensile stresses are prevented or reduced to an acceptable level. In particular with three layers, a composite material divided into a friction portion and a core portion can be produced at an economical cost.

In order to achieve the aforementioned advantages, the SiC content of the matrix should increase from the core area of the friction body to the friction surface, i.e. the higher converted areas are on the outside, so that the SiC content is higher in these areas.

In order to quickly remove any abrasion from the friction surface areas during emergency braking, indentations and, in particular, grooves can be provided in the friction surface areas. Preferably, the indentations should be arranged transversely to the direction of friction or, alternatively, at an angle of 30° to 60° to the direction of friction; an advantageous angle is 45°. The indentations should also be 1 to 5 mm wide to be able to absorb enough abraded material. The area indented in the friction surface should be 30% of the entire friction surface area.

A layer containing Si and SiC on the friction surface with preferably a thickness of 0.01 to 0.2 mm, can increase the wear resistance compared to uncoated friction elements. It should, however, also be ensured that the ceramic layer offers a high enough adhesion at high temperatures. A layer thickness of up to 0.2 mm is preferred, as thicker layers cause flaking and thus the failure of the friction layer.

An advantageous fiber volume content of the composite material is at least 50%; values of 50% or higher result in a particularly high strength and fracture resistance.

Where friction elements with ceramic layers are, for instance, unsuitable because of too soft counterparts (guide rail), the composite material should have an open porosity of ±10%. An open porosity above this value can be disadvantageous as the friction coefficient decreases due to the absorption of abraded particles, oil and fatty constituents from the guide rail, etc.

In order to achieve a sufficiently high wear resistance, the SiC content of the composite material is set to at least 20 mass percent, with this value relating to the entire friction element and representing a lower limit for the friction surface area.

Carbon fibers formed from bundles of at least 1000 individual filaments, with the individual filaments having a diameter of between 5 to 15 μm "micrometers", offer the advantage of a macroscopically even SiC distribution in the composite material. It also allows the cheaper production of friction elements as numerous semi-finished fiber products with these dimensions are commercially available. In order to achieve a high level of strength for the arising abrupt stresses, provide the required safety reserves and allow the production of large-size friction elements, the composite material should have a bending strength of at least 50 Mpa.

A preferred composite material for friction elements is formed by liquid siliconization of a carbon/carbon element, produced by the pyrolysis of a green element bound with phenolic resin and reinforced with carbon fibers. Such a procedure can be used to produce friction elements, which, on one hand, have a sufficiently high content of C fibers and, on the other hand, have a sufficiently high content of SiC. With this procedure, in particular, different C and SiC contents between areas proximal to the friction surface and the core area can be achieved.

A preferred composite material for friction elements can be characterized by 40 to 45 mass percent SiC, 2 to 6 mass percent Si and 49 to 58 mass percent C and C fibers.

If the friction elements are structured in thickness, i.e. with a different layer structure, the friction body should be structured symmetrically to the center plane in relation to the thickness of the friction element.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Described below are embodiments of friction elements for the use in safety devices of elevators with an elevator guide rail, securely installed in the elevator shaft, onto which the friction bodies lock during emergency braking.

Embodiment I

A friction element constructed from a matrix consisting of 95 weight percent of silicon carbide and carbon and a fiber reinforcement consisting of stacked layers of carbon fiber fabrics with the carbon fibers having a fiber orientation in the direction of 0° and 90°. The carbon fibers consisted of HTA fibers produced by Akzo Nobel of Wuppertal, Germany with a filament number of 3000.

Figure 1:
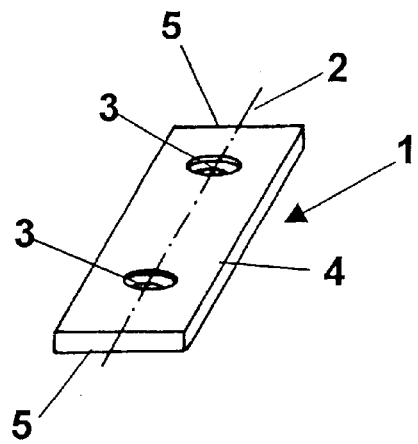
FIG. 1 is a perspective view of a first embodiment friction element in accordance with the present invention.

Such a friction element or lining 1 is shown in FIG. 1. The example friction element 1 has a generally rectangular body being 120 mm long, 40 mm wide and 8 mm thick. Two fixing holes 3 are positioned on a longitudinal axis 2 with their axes extending vertical to a planar friction surface 4. The axes of these fixing holes 3 are positioned at a distance of 25 mm from a shorter side 5 of the friction element 1. Each of the fixing holes 3 has a stepped cross section that allows the head of a fixing screw or rivet (not shown) to be accommodated in a wider diameter area so that it does not protrude above the friction surface 4.

The friction element 1, as shown in FIG. 1, is produced in three steps. First, a carbon fiber reinforced polymer (CFRP) green element, bound in phenolic resin and with a fiber content of 50–55% is produced in an autoclave. The CFRP green element is then pyrolysed at temperatures of up to 1650° C. in a second step. During a third step, the porous carbon/carbon material generated during the pyrolysis, is impregnated with liquid silicon at a siliconization temperature of at least 1420° C.

The thus produced friction element 1 had the following characteristic values:

Density: 2.0 g/cm$^3$

Open porosity <2%

Phase contents in mass percent: approx. 40% SiC, approx. 5% Si and approx. 55% C and C fibers Short bending strength: 120 MPa.

Figure 4:
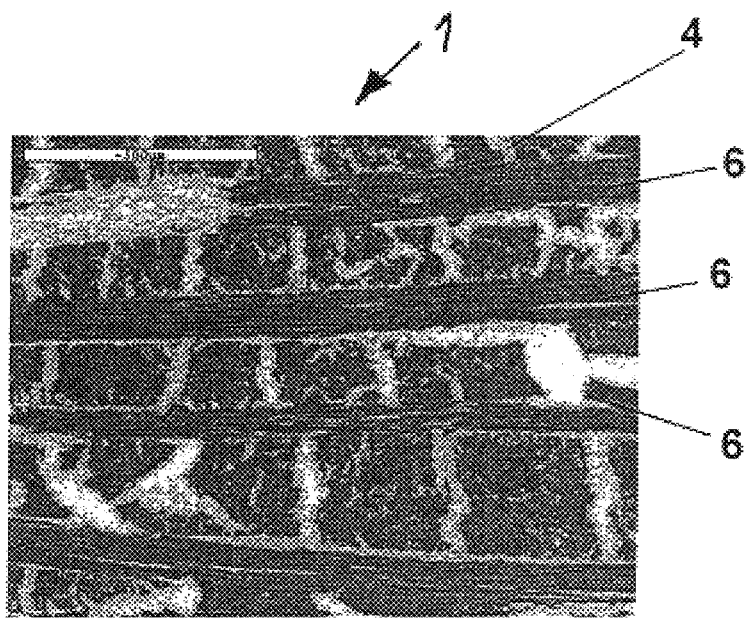
FIG. 4 is an enlarged cross-sectional view of the microstructure of the friction element shown in FIG. 1 as if taken transverse to the longitudinal axis.
Figure 5:
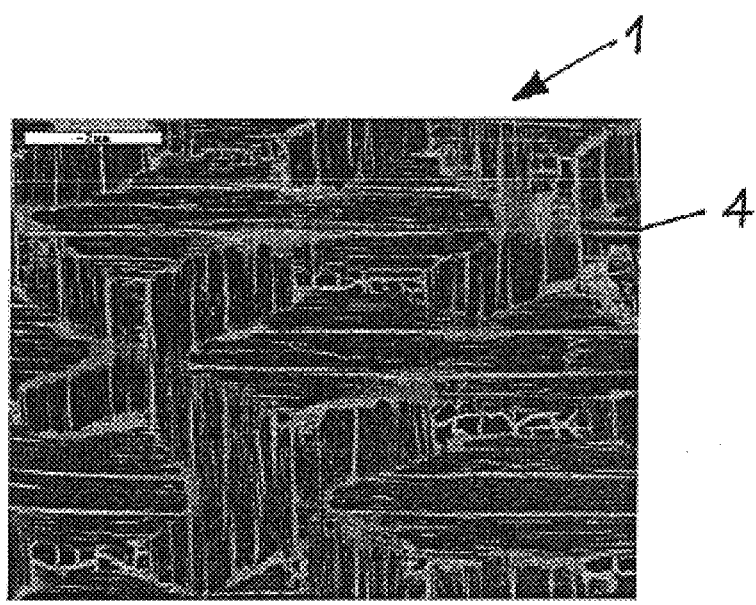
FIG. 5 is an enlarged plan view of the microstructure of the friction surface of the friction element shown in FIG. 1.

The micro structure of the friction element 1 is shown in FIGS. 4 and 5 with FIG. 4 showing a cross section transverse to the friction surface 4 of FIG. 1, while FIG. 5 shows a plan view of the friction surface 4. FIG. 4 is at 100× magnification, and FIG. 5 is at 15× magnification.

Both FIGS. 4 and 5 clearly show the carbon fibers 6 that run parallel to the friction surface 4 as indicated in FIG. 4. The white or light areas represent silicon carbide surrounding the individual carbon fibers and filling the interstices. The friction surface 4 therefore always provides a simultaneous SiC and C phase contact, with the C content being predominant in volume and mass.

FIG. 5 shows the woven structure of the carbon fiber shell with the fibers being arranged at 0° and 90° to each other (the surface is polished). The length of the fibers used in this embodiment corresponded exactly with the geometric dimensions of the friction element, i.e. 120 mm in the 0° direction and 40 mm in the 90° direction.

Embodiment II

A friction element was constructed from a matrix consisting predominantly of silicon carbide and carbon and a fiber reinforcement consisting of stacked layers of carbon fiber fabrics (the Akzo HTA fibers with a filament number of 3000 as described above) with the carbon fibers having an orientation of 0° and 90°. In order to increase wear resistance and the friction coefficient, the ceramic content in the friction areas or portions proximal to the friction surfaces was significantly increased compared to the core area or portion. In order to prevent distortion, the friction linings were constructed symmetrically to a center plane in relation to the thickness of the friction element body.

The friction lining of Embodiment II was produced in accordance with the three steps as described with respect to Embodiment I. First, a CFRP green element with a fiber volume content of approx. 60% was produced by a resin injection process; prior to resin infiltration, the individual carbon fabric layers were aged for approximately 20 minutes under inert conditions at different conditioning temperatures of 600° C., 750° C., 900° C. and 1100° C. The individual layers were 0.25 mm thick and were structured symmetrically to the central plane. A total of 26 layers were used (see FIG. 6).

The thus constructed CFRP green element was then pyrolysed at temperatures of up to 1650° C. in a second step. During a third step, the porous carbon/carbon material generated during the pyrolysis, was impregnated with liquid silicon at a siliconization temperature of 1650° C.

The thus produced C/C-SiC material had the following characteristic values:

Density: 2.0 g/cm$^3$

Open porosity <2%

Phase contents in mass percent: approx. 45% SiC, approx. 5% Si and approx. 50% C and C fibers Brief bending strength: 55 MPa.

Figure 6:
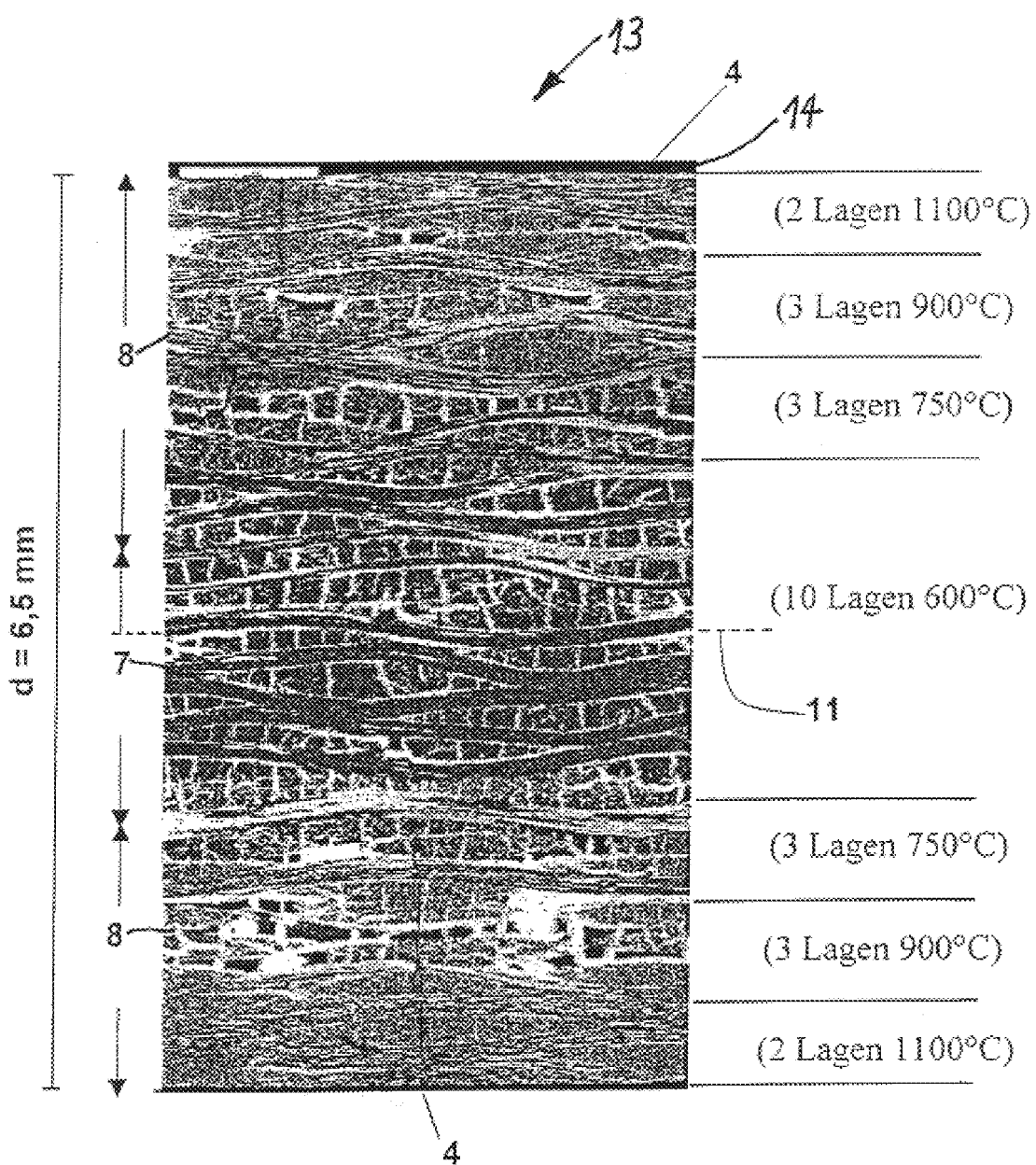
FIG. 6 is an enlarged cross-sectional view of the micro structure of a second embodiment friction element as if taken transverse to a longitudinal axis.
Figure 7:
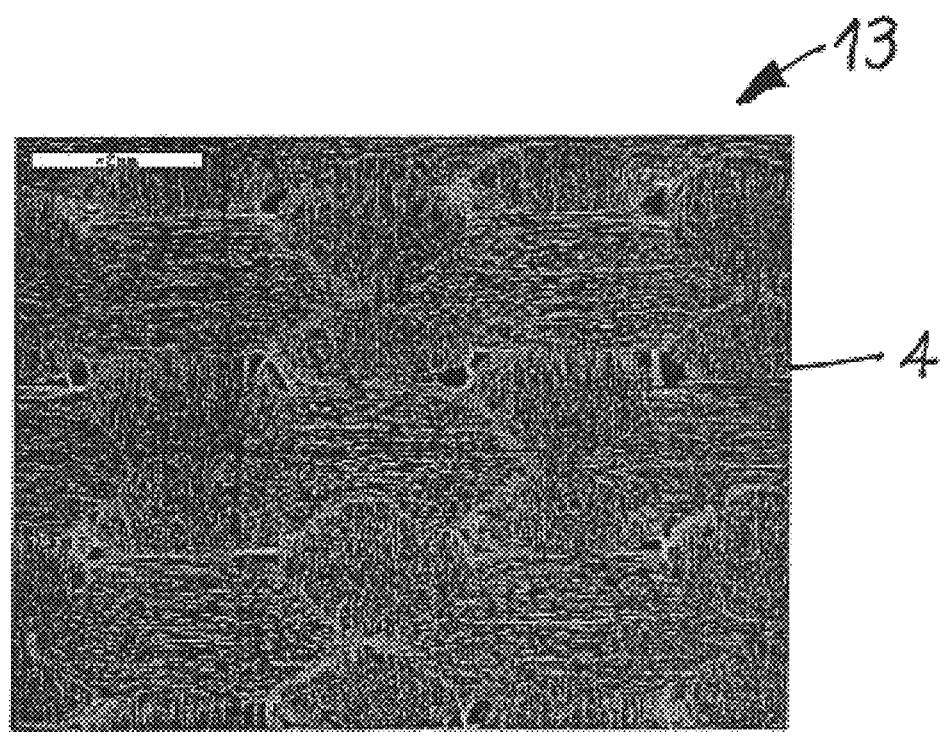
FIG. 7 is an enlarged plan view of the microstructure of the friction surface of the friction element shown in FIG. 6.

The micro structure of an Embodiment II friction element 13 is shown in FIGS. 6 and 7 with FIG. 6 being at 35× magnification and FIG. 7 being at 15× magnification. From FIG. 6, showing the layered structure of the friction element 13, i.e. transverse to the friction surface 4, the areas of the differently conditioned carbon fabric layers are apparent. In this figure, the carbon fibers in a central portion 7 of the body are fibers thermally aged at 600° C., while the carbon fibers in adjacent friction portions 8 extending in layers out to the friction surface 4 of the body were subjected to aging temperatures increased from the center plane 11—i.e. increasing from the center area at 600° C. to 750° C., then 900° C., and finally 1100° C. The individual layers from which such a friction element can be constructed, can be connected to each other with reaction siliconization.

From a comparison between the surface structure of the Embodiment I friction element 1 shown in FIG. 5 and the surface structure of the Embodiment II friction element 13 shown in FIG. 7, it is apparent that the friction element of FIG. 7 has a considerably higher SiC content (light areas) at the outer areas, close to the friction surface 4. The shown friction surface 4 also has the advantage of a finely distributed SiC matrix that does not damage the metal guide rail and prevents any scoring of the rail. A friction element made according to the Embodiment II (FIG. 6) is, for example, preferable where particularly high and constant friction coefficients are required.

As shown in FIG. 6, a ceramic layer 14 containing Si and SiC on the friction surface 4 with preferably a thickness of 0.01 to 0.2 mm, can increase the wear resistance compared to uncoated friction elements. It should, however, also be ensured that the ceramic layer 14 offers a high enough adhesion at high temperatures. A layer thickness of up to 0.2 mm is preferred, as thicker layers cause flaking and thus the failure of the friction layer.

Figure 2:
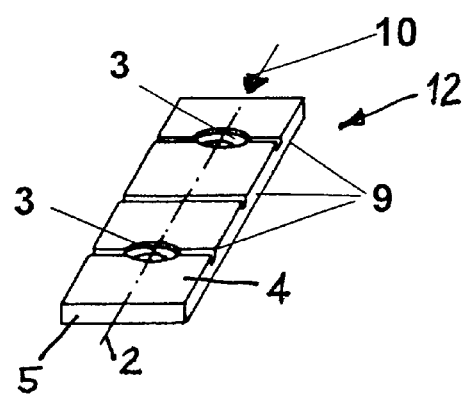
FIG. 2 is perspective view of the friction element shown in FIG. 1 showing an alternate construction.
Figure 3:
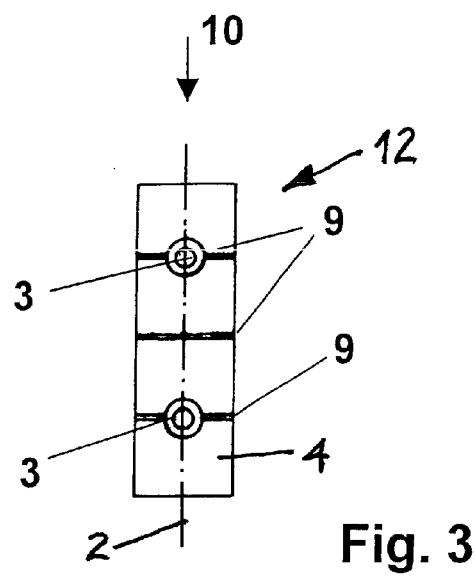
FIG. 3 is a plan view of the friction element shown in FIG. 2.

In FIG. 2, there is shown an alternate construction friction element or lining 12 similar to the friction lining 1 shown in FIG. 1, but provided with a plurality of grooves 9 formed in the friction surface 4 and extending transverse to a friction direction indicated by an arrow 10. The friction direction is parallel to the longitudinal axis 2 and to a longitudinal axis of the guide rail (not shown) to which the friction element surface 4 is applied. The grooves 9 are 2 mm wide and 2 mm deep. The friction element 12 shown in FIGS. 2 and 3 has three such grooves 9, although more or less grooves could be used. The grooves 9 prevent clogging of the friction surface 4 of the friction element 12 and guarantee a defined friction condition, i.e. wear particles generated during emergency braking are deposited in the grooves 9 and do thus not adversely affect the friction coefficient. The wear particles are predominantly metal particles abraded from the metal guide rails onto which the friction element 12 locks.

While the friction elements 1, 12 and 13 have been illustrated as having generally planar bodies, they could be contoured to correspond to the shape of the guide rail surface (e.g. curved in cross section) to which they are applied.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A friction element for a safety braking device for elevators co-operating with at least one elevator guide rail, the friction element having at least one friction surface that can be pressed against the guide rail to decelerate the elevator, comprising: a friction element body having at least one friction surface, said friction element body being formed of a fiber-reinforced, ceramic composite material being a matrix of silicon carbide (SiC) and carbon (C) with carbon fibers as reinforcing components and wherein a SiC material content of said matrix is higher in a portion of said friction element body proximate said friction surface than in a portion of said friction element body distal from said friction surface, said friction element body having a phase content in mass percent of SiC in a range of 40% to 45%, Si in a range of 2% to 6%, and C and C fibers in a range of 49% to 58%.

2. A friction element for a safety braking device for elevators comprising: a friction element body having at least one friction surface, said friction element body being formed at a fiber-reinforced ceramic composite material being a matrix of carbon (C) and silicon carbide (SiC) with carbon fibers as reinforcing components, said carbon fibers being arranged in a multiple layer, layered structure, wherein a content of said silicon carbide material gradually increases from a central one of said layers toward a one of said layers at said at least one friction surface of said body, said increase being produced by preparatoy thermal conditioning of said carbon fibers of different ones of said layers at different associated temperatures.

3. The friction element according to claim 2 wherein said carbon fibers are at least 10 mm in length.

4. The friction element according to claim 2 wherein said carbon fibers are in a range of 30% to 70% of a total volume of said friction element body.

5. The friction element according to claim 2 wherein said carbon fibers are arranged as multiple stacked layers of at least one of woven and knitted fabrics.

6. The friction element according to claim 5 wherein said carbon fibers of said one of said layers at said at least one friction surface run parallel to a friction direction of said friction element body.

7. The friction element according to claim 2 wherein said friction element body has a central portion and at least one adjacent friction portion including said at least one friction surface.

8. The friction element according to claim 7 wherein said at least one adjacent portion is formed of individual layers connected to each other by reaction siliconization.

9. The friction element according to claim 7 wherein said at least one adjacent friction portion is formed of three individual layers connected to each other.

10. The friction element to claim 2 including at least one groove formed in said at least one friction surface at an angle to a friction direction of said friction element body.

11. The friction element according to claim 2 including a ceramic layer containing Si and SiC on said at least one friction surface, said ceramic layer having a thickness of between 0.01 to 0.2 mm.

12. The friction element according to claim 2 wherein said friction element body has a phase content in mass percent of SiC in a range of 40% to 45%, Si in a range of 2% to 6%, and C and C fibers in a range of 49% to 58%.

13. A friction element for an elevator safety braking device comprising:
  a friction element body formed as a layered structure having layers of carbon fibers bound with a phenolic resin and pyrolyzed; and
  a silicon material and a carbon material impregnating said layers and forming a matrix of silicon carbide material and said carbon material with said carbon fibers upon exposure to a siliconization temperature and wherein a content of said silicon carbide material increases from a central one of said layers toward a one of the layers at a friction surface of said body.

14. The friction element according to claim 13 including a ceramic layer formed at said friction surface of said body.

15. The friction element according to claim 13 including said carbon fibers in each of said layers being thermally aged at different temperatures.

* * * * *